United States Patent
Harada et al.

(10) Patent No.: US 9,652,660 B2
(45) Date of Patent: May 16, 2017

(54) CONTROL SYSTEM, ROBOT SYSTEM, AND CONTROL METHOD

(71) Applicant: Seiko Epson Corporation, Tokyo (JP)

(72) Inventors: Tomoki Harada, Matsumoto (JP); Koichi Hashimoto, Sendai (JP); Shogo Arai, Sendai (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/810,657

(22) Filed: Jul. 28, 2015

(65) Prior Publication Data

US 2016/0034746 A1 Feb. 4, 2016

(30) Foreign Application Priority Data

Jul. 29, 2014 (JP) ................. 2014-153750

(51) Int. Cl.
| | |
|---|---|
| *G06K 9/00* | (2006.01) |
| *G06K 7/00* | (2006.01) |
| *G01B 11/30* | (2006.01) |
| *G06K 9/50* | (2006.01) |
| *B25J 9/16* | (2006.01) |
| *G06T 7/00* | (2017.01) |

(52) U.S. Cl.
CPC ........ *G06K 9/00201* (2013.01); *B25J 9/1697* (2013.01); *G06K 9/50* (2013.01); *G06T 7/0057* (2013.01); *G06T 7/0075* (2013.01); *Y10S 901/47* (2013.01)

(58) Field of Classification Search
CPC .... G06K 9/00201; G06K 9/50; G06T 7/0075; G06T 7/0057; G06T 2207/10012; G06T 7/0022; B25J 9/1697; Y10S 901/47; H04N 13/0239; H04N 2013/0081

USPC ....... 382/154, 173, 168, 181, 190, 195, 203, 382/206, 207, 254, 276, 285, 293, 294, 382/312; 700/259; 714/1, 56, 49, 714/E11.058, 11; 356/12, 603, 604, 610

See application file for complete search history.

(56) References Cited

U.S. PATENT DOCUMENTS 7,349,104 B2 * 3/2008 Geng .................. A61B 5/1077
348/E5.029
7,724,379 B2 * 5/2010 Kawasaki .......... G01B 11/2509
356/603

(Continued)

FOREIGN PATENT DOCUMENTS

| | | |
|---|---|---|
| JP | 2009-115612 A | 5/2009 |
| JP | 2015-087321 A | 5/2015 |

*Primary Examiner* — Sheela C Chawan
(74) *Attorney, Agent, or Firm* — Harness, Dickey & Pierce, P.L.C.

(57) ABSTRACT

A control system includes a projection section that projects predetermined patterned light on a target object, a first imaging section that captures an image of the target object on which the predetermined patterned light is projected by the projection section, a second imaging section that is disposed in a position different from a position where the first imaging section is disposed and captures an image of the target object on which the predetermined patterned light is projected by the projection section, and a calculation section that calculates a three-dimensional shape of the target object based on a first point in a first captured image captured by the first imaging section and a second point in a second captured image captured by the second imaging section.

9 Claims, 9 Drawing Sheets

(56) References Cited

U.S. PATENT DOCUMENTS

| | | | |
|---|---|---|---|
| 7,957,583 B2* | 6/2011 | Boca | B25J 9/1697 |
| | | | 345/419 |
| 8,095,237 B2* | 1/2012 | Habibi | B25J 9/1692 |
| | | | 29/702 |
| 8,103,085 B1* | 1/2012 | Zadeh | G06T 7/001 |
| | | | 356/237.1 |
| 8,437,535 B2* | 5/2013 | Boca | G01B 11/25 |
| | | | 382/154 |
| 9,124,873 B2* | 9/2015 | Liu | H04N 13/0203 |

* cited by examiner

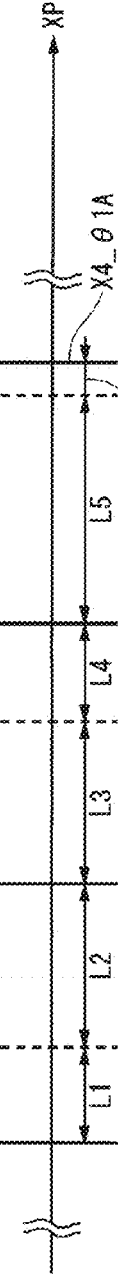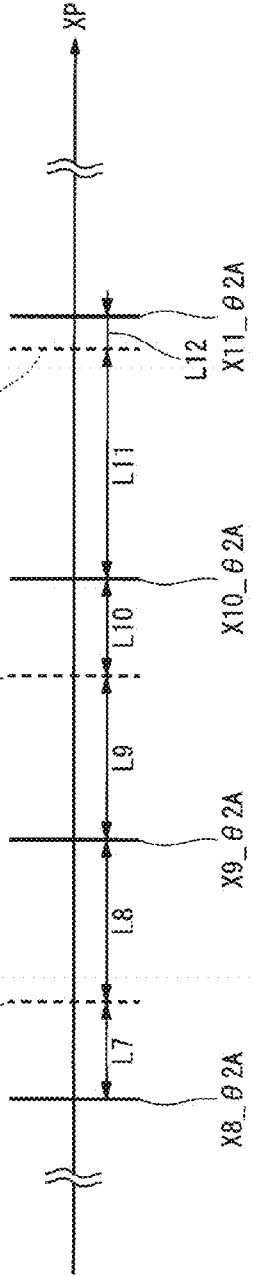
FIG. 7A
FIG. 7B

CONTROL SYSTEM, ROBOT SYSTEM, AND CONTROL METHOD

BACKGROUND

1. Technical Field

The present invention relates to a control system, a robot system, and a control method.

2. Related Art

In recent years, there has been an increased demand for a technology for accurate three-dimensional shape measurement. Accurate three-dimensional shape measurement, when it is achieved, is conceivably used in a variety of applications, such as inspection of scratches on an industrial product or any other object, bin picking, and using a measurement result with the aid of a three-dimensional printer.

As a three-dimensional shape measurement method of related art, there is known three-dimensional shape measurement using a phase shift method in which one projector and one camera are used (see JP-A-2009-115612). The method includes causing the camera to capture an image of a sinusoidal pattern projected by the projector, calculating the correspondence of the pixels of the captured image to the pixels of the projection image (that is, the correspondence of the pixels associated with the projector and the pixels associated with the camera), and calculating the depth of a target object based on triangulation.

However, in the method of the related art, in which one projector and one camera are used, it is difficult to measure the three-dimensional shape of a hidden portion that cannot be imaged with the camera and a hidden portion that cannot be reached by the light from the projector.

SUMMARY

An advantage of some aspects of the invention is to provide a control system, a robot system, and a control method that allow measurement of a variety of three-dimensional shapes.

An aspect of the invention is directed to a control system including a projection section that projects predetermined patterned light on a target object, a first imaging section that captures an image of the target object on which the predetermined patterned light is projected by the projection section, a second imaging section that is disposed in a position different from a position where the first imaging section is disposed and captures an image of the target object on which the predetermined patterned light is projected by the projection section, and a calculation section that calculates a three-dimensional shape of the target object based on a first point in a first captured image captured by the first imaging section and a second point in a second captured image captured by the second imaging section.

The thus configured control system projects the predetermined patterned light on the target object, causes the first imaging section to capture an image of the target object on which the predetermined patterned light is projected by the projection section, causes the second imaging section, which is disposed in a position different from the position where the first imaging section is disposed, to capture an image of the target object on which the predetermined patterned light is projected by the projection section, and calculates the three-dimensional shape of the target object based on the first point in the first captured image captured by the first imaging section and the second point in the second captured image captured by the second imaging section. The control system can thus measure a variety of three-dimensional shapes.

In another aspect of the invention, the control system may further include a reliability calculation section that calculates, based on the first captured image and the second captured image, reliability that serves as an index representing probability of coincidence of a position identified by a certain point in the first captured image and a position identified by each point in the second captured image and a relating section that relates each point in the first captured image to a corresponding point in the second captured image based on the reliabilities calculated by the reliability calculation section.

The thus configured control system calculates, based on the first captured image and the second captured image, the reliability that serves as an index representing the probability of coincidence of the position identified by a certain point in the first captured image and the position identified by each point in the second captured image and relates each point in the first captured image to a corresponding point in the second captured image based on the calculated reliabilities. The control system can thus perform calibration between the two imaging sections.

In another aspect of the invention, in the control system, the reliability calculation section may derive a first likelihood function corresponding to each point in the first captured image, derive a second likelihood function corresponding to each point in the second captured image, and calculate the reliabilities based on the derived first and second likelihood functions.

The thus configured control system derives the first likelihood function corresponding to each point in the first captured image and the second likelihood function corresponding to each point in the second captured image and calculates the reliabilities based on the derived first and second likelihood functions. The control system can thus calculate the reliabilities based on the likelihood functions and perform the calibration between the two imaging sections based on the calculated reliabilities.

In another aspect of the invention, in the control system, the patterned light may be patterned light having luminance or hue that periodically changes in a certain direction, and the reliability calculation section may calculate a first phase associated with the change in luminance or hue of the patterned light at each point in the first captured image and a second phase associated with the change in luminance or hue of the patterned light at each point in the second captured image, derive the first likelihood function based on the calculated first phase, and derive the second likelihood function based on the second phase.

The thus configured control system calculates the first phase associated with the change in luminance or hue of the patterned light at each point in the first captured image and the second phase associated with the change in luminance or hue of the patterned light at each point in the second captured image, derives the first likelihood function based on the calculated first phase, and derives the second likelihood function based on the second phase. The control system can thus derive the likelihood functions based on the phases associated with the change in luminance or hue of patterned light to calculate the reliabilities.

Still another aspect of the invention is directed to a robot system including any of the control systems described above and a robot, and the control system includes a robot control section that controls the robot based on the three-dimensional shape of the target object calculated by the calculation section.

The thus configured robot system can control the robot based on the three-dimensional shape of the target object calculated by the calculation section. The robot system can thus perform robust measurement of the three-dimensional shape.

Yet another aspect of the invention is directed to a control method including projecting predetermined patterned light on a target object, causing a first imaging section to capture an image of the target object on which the predetermined patterned light is projected, causing a second imaging section that is disposed in a position different from a position where the first imaging section is disposed to capture an image of the target object on which the predetermined patterned light is projected, and calculating a three-dimensional shape of the target object based on a first point in a first captured image captured by the first imaging section and a second point in a second captured image captured by the second imaging section.

The thus configured control method includes projecting the predetermined patterned light on the target object, causing the first imaging section to capture an image of the target object on which the predetermined patterned light is projected by a projection section, causing the second imaging section that is disposed in a position different from a position where the first imaging section is disposed to capture an image of the target object on which the predetermined patterned light is projected by the projection section, and calculating a three-dimensional shape of the target object based on a first point in a first captured image captured by the first imaging section and a second point in a second captured image captured by the second imaging section. The control method can thus perform robust measurement of the three-dimensional shape.

As described above, the control system, the robot system, and the control method project predetermined patterned light on a target object, cause a first imaging section to capture an image of the target object on which the predetermined patterned light is projected by a projection section, cause a second imaging section that is disposed in a position different from a position where the first imaging section is disposed to capture an image of the target object on which the predetermined patterned light is projected by the projection section, and calculate a three-dimensional shape of the target object based on a first point in a first captured image captured by the first imaging section and a second point in a second captured image captured by the second imaging section. The control system, the robot system, and the control method can thus perform robust measurement of the three-dimensional shape.

BRIEF DESCRIPTION OF THE DRAWINGS

The invention will be described with reference to the accompanying drawings, wherein like numbers reference like elements.

FIGS. 7A and 7B describe the process in step S220 carried out by the reliability calculation section.

DESCRIPTION OF EXEMPLARY EMBODIMENTS

Embodiment

Figure 1:
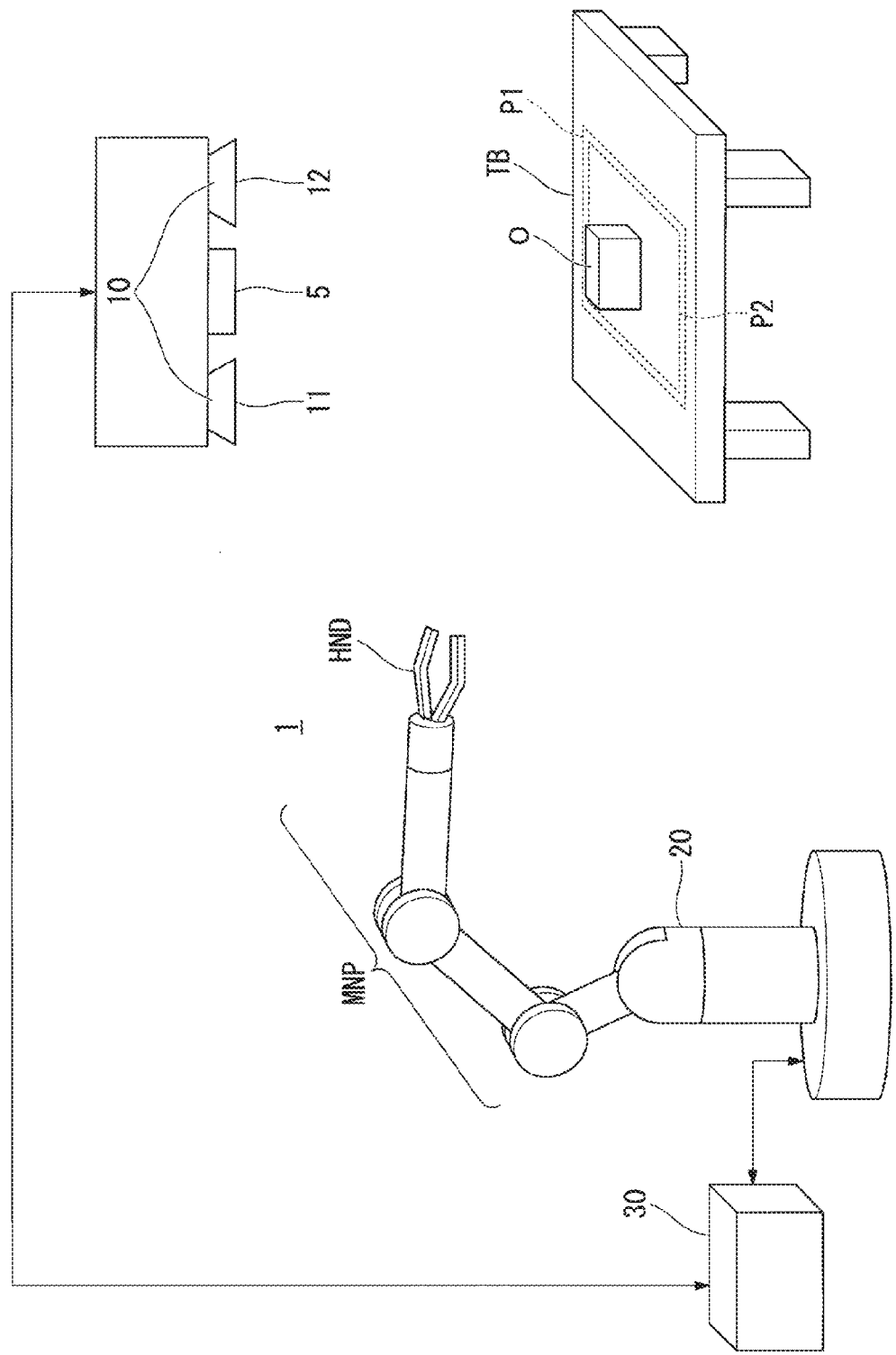
FIG. 1 is a configuration diagram showing an example of a robot system according to an embodiment of the invention.

An embodiment of the invention will be described below with reference to the drawings. FIG. 1 is a configuration diagram showing an example of a robot system 1 according to the present embodiment. The robot system 1 includes a projection section 5, an imaging unit 10, a robot 20, and a controller 30. The imaging unit 10 is a stereoscopic camera including a first imaging section 11 and a second imaging section 12. The imaging unit 10 may instead include three or more imaging sections.

In FIG. 1, a target object O is placed on a table TB. The table TB is, for example, a stand on which the target object O is placed. The target object O is an object that is involved in the action performed by the robot 20 and is an industrial part, such as a screw, a bolt, a gear, and a fixture or a container that accommodates the industrial part or any other object. The target object O is, however, not limited to those described above and may be any other object that is involved in the action performed by the robot 20. The target object O is roughly so sized that it entirely falls within a region where a projection range P1 and an imaging range P2 coincide with each other. In FIG. 1, the target object O is drawn as a box-shaped object.

The robot system 1 selects an image as a projection image one by one from prestored images formed of one set of four images and another set of four images, eight images in total. The robot system 1 then controls and causes the projection section 5 to project the selected projection image in the projection range P1, which contains the target object O placed on the table TB. Each of the eight images described above is an image having luminance periodically changing in the plane of the image with the wave representing the periodic change in luminance extending in the horizontal direction in the plane of the image. Each of the eight images may instead be an image with the wave representing the periodic change in luminance extending in the vertical direction, in an oblique direction, or in any other direction in the plane of the image.

In the one set of four images among the prestored eight images, the waves representing the periodic change in luminance have a predetermined wave number A. Among the four images, the waves representing the periodic change in luminance differ from each other in terms of phase by $\pi/2$. More specifically, assuming that a reference image among the four images is an image of $n=0$, an image of $n=1$ differs from the reference image in terms of phase by $\pi/2$, an image of $n=2$ differs from the reference image in terms of phase by $\pi$, and an image of $n=3$ differs from the reference image in terms of phase by $3\pi/2$. In the following description, the image of n=0 is referred to as a projection image PA0, the image of n=1 is referred to as a projection image PA1, the image of n=2 is referred to as a projection image PA2, and the image of n=3 is referred to as a projection image PA3 for ease of description. Further, in the following description, the projection images PA0 to PA3 are collectively referred to as projection images PA when they do not need to be distinguished from each other. The projection images PA may differ from each other in terms of phase by a value different from π/2.

On the other hand, in the other set of four images among the eight prestored images, the waves representing the periodic change in luminance have a predetermined wave number B, which differs from the wave number A. Among the four images, the waves representing the periodic change in luminance differ from each other in terms of phase by π/2. More specifically, assuming that a reference image among the four images is an image of n=0, an image of n=1 differs from the reference image in terms of phase by π/2, an image of n=2 differs from the reference image in terms of phase by π, and an image of n=3 differs from the reference image in terms of phase by 3π/2. In the following description, the image of n=0 is referred to as a projection image PB0, the image of n=1 is referred to as a projection image PB1, the image of n=2 is referred to as a projection image PB2, and the image of n=3 is referred to as a projection image PB3 for ease of description. Further, in the following description, the projection images PB0 to PB3 are collectively referred to as projection images PB when they do not need to be distinguished from each other. The projection images PB may differ from each other in terms of phase by a value different from π/2.

Figure 2:
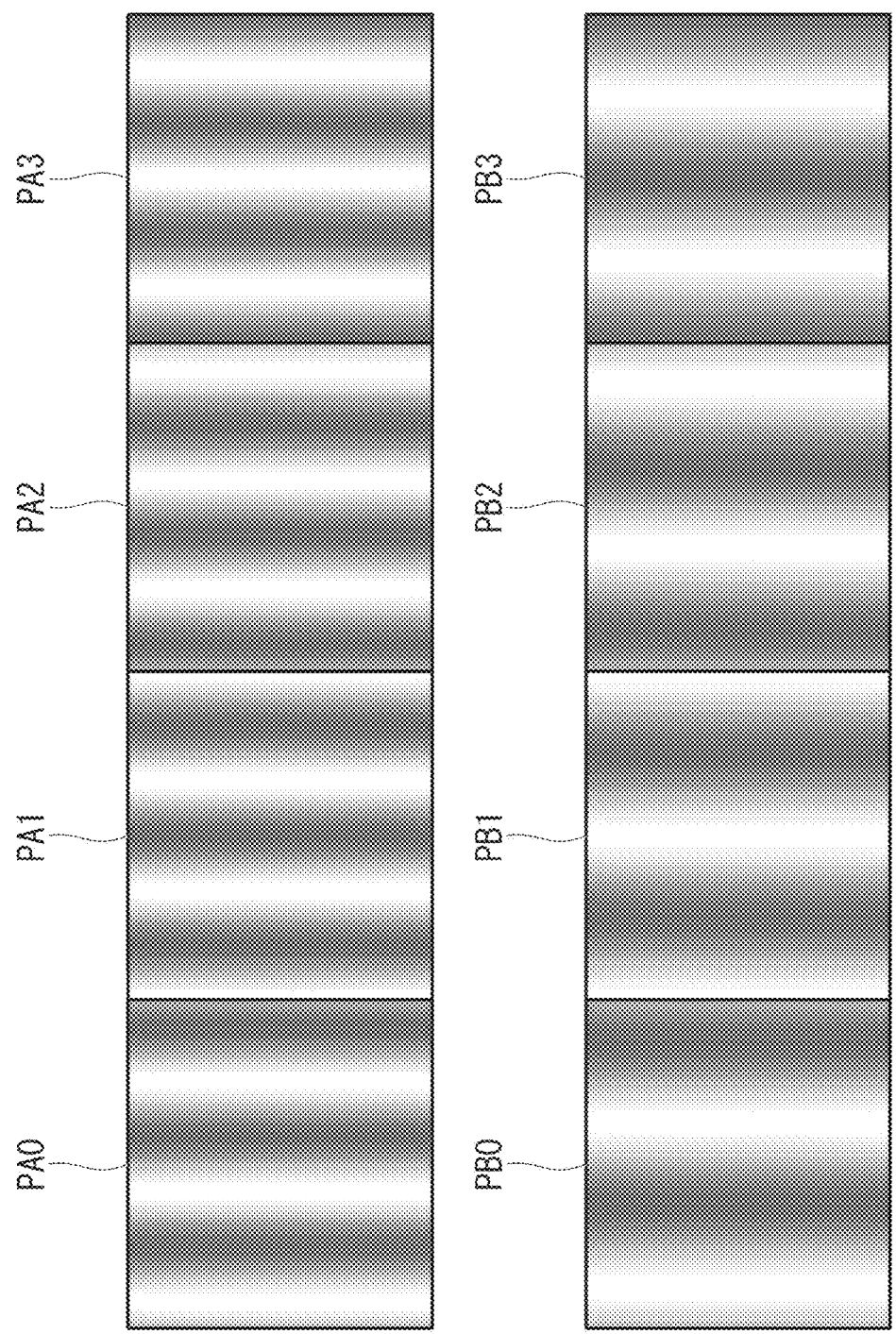
FIG. 2 illustrates projection images projected by a projection section.

The projection images projected by the projection section 5 will now be described with reference to FIG. 2. FIG. 2 illustrates the projection images PA and PB projected by the projection section 5. Among the projection images PA0 to PA3, the waves representing the periodic change in luminance differ from each other in terms of phase by π/2. In the projection images PA0 to PA3, a point where brightness is high is a point where luminance is high, whereas a point where brightness is low is a point where luminance is low.

The wave representing the periodic change in luminance in each of the projection images PA0 to PA3 is a plane wave (sinusoidal wave) traveling in the horizontal direction in the plane of the projection image. The wave may instead be a plane wave traveling in the vertical direction or a plane wave traveling in an oblique direction as described above or even a spherical wave or any other wave. Each of the projection images PA0 to PA3 may, for example, be an image in which the color periodically changes instead of an image in which the luminance periodically changes.

The waves representing the change in luminance shown in the projection images PB0 to PB3 differ from the waves representing the change in luminance shown in the projection images PA0 to PA3 in terms of wave number. Among the projection images PB0 to PB3, the waves representing the periodic change in luminance differ from each other in terms of phase by π/2. In the projection images PB0 to PB3, a point where brightness is high is a point where luminance is high, whereas a point where brightness is low is a point where luminance is low. The wave representing the periodic change in luminance in each of the projection images PB0 to PB3 is a plane wave (sinusoidal wave) traveling in the horizontal direction in the plane of the projection image. The wave may instead be a plane wave traveling in the vertical direction or a plane wave traveling in an oblique direction as described above or even a spherical wave or any other wave.

Each of the projection images PB0 to PB3 may, for example, be an image in which the color periodically changes instead of an image in which the luminance periodically changes. Instead of the four images having phases different from each other, one or both of the projection images PA and/or the projection images PB may be other number of images having phases different from each other so long as the number of images is three or more. In this case, the difference in phase among the images is desirably a value different from π/2. The projection images PA and the projection images PB are an example of predetermined patterned light.

After a certain single projection image selected from the eight prestored images is projected in the projection range P1 containing the target object O placed on the table TB, the robot system 1 causes the first imaging section 11 and the second imaging section 12 of the imaging unit 10 to capture an image of the imaging range P2 containing the target object O placed on the table TB. In the following description, a captured image captured by the first imaging section 11 is referred to as a first captured image, and a captured image captured by the second imaging section 12 is referred to as a second captured image for ease of description.

The robot system 1 performs the image projection by using the projection section 5 and the image capturing by using the first imaging section 11 and the second imaging section 12 of the imaging unit 10 on the eight pre-stored images described above. The robot system 1 thus acquires eight first captured images (four first captured images associated with projection images PA and four first captured images associated with projection images PB) and eight second captured images (four second captured images associated with projection images PA and four second captured images associated with projection images PB).

The robot system 1 performs calibration for relating in-plane coordinates in a first captured image to be captured by the first imaging section 11 and in-plane coordinates in a second captured image to be captured by the second imaging section 12 to each other based on a double phase shift method using the eight first captured images captured by the first imaging section 11 and the eight second captured images captured by the second imaging section 12. In the present embodiment, the in-plane coordinates in a first captured image refer to the coordinates that identify the points in a first captured image captured by the first imaging section 11 and are, for example, the coordinates in an imaging device plane of the first imaging section 11. Similarly, the in-plane coordinates in a second captured image refer to the coordinates that identify the points in a second captured image captured by the second imaging section 12 and are, for example, the coordinates in an imaging device plane of the second imaging section 12.

In the following description, first captured images associated with the projection images PA0 to PA3 are referred to as first captured images 1A0 to 1A3 respectively, and first captured images associated with the projection images PB0 to PB3 are referred to as first captured images 1B0 to 1B3 respectively for ease of description. Similarly, in the following description, second captured images associated with the projection images PA0 to PA3 are referred to as second captured images 2A0 to 2A3 respectively, and second captured images associated with the projection images PB0 to PB3 are referred to as second captured images 2B0 to 2B3 respectively for ease of description.

The robot system 1 can relate the in-plane coordinates in a first captured image and the in-plane coordinates in a second captured image to each other with higher accuracy than a case where the in-plane coordinates in a first captured image and the in-plane coordinates in a second captured image are related to each other with the aid of the correspondence of the in-plane coordinates in the first and second captured images to the in-plane coordinates in a projection image projected by the projection section 5 (calibration performed in advance between each imaging section and projection section). In the present embodiment, the in-plane coordinates in a projection image refer to the coordinates that identify the points in a variety of projection images projected by the projection section 5 and are, for example, the coordinates in a liquid crystal panel plane of the projection section 5.

Having completed the calibration, the robot system 1 causes the first imaging section 11 and the second imaging section 12 to capture stereoscopic images of the target object O placed on the table TB and generates a group of three-dimensional points on the target object O by using a stereoscopy method based on the first and second captured images captured by the imaging sections. The robot system 1 then calculates the three-dimensional position and the attitude of the target object O based on the generated group of three-dimensional points. The robot system 1 can thus calculate the position and the attitude of the target object O with accuracy by using the stereoscopy method based on the first captured image and the second captured image in place of an active stereoscopy method even when the target object O has a hidden portion that cannot be reached by the light from the projection section 5. In the following description, the three-dimensional position and the attitude of the target object O are referred to as a target object position/attitude for ease of description.

When the target object O has a hidden portion that cannot be imaged by one of the first imaging section 11 and the second imaging section 12 (that is, when stereoscopic imaging using the first imaging section 11 and the second imaging section 12 cannot be performed), the robot system 1 calculates the target object position/attitude by using an active stereoscopy method based on captured images captured by one of the first imaging section 11 and the second imaging section 12 and a projection image projected by the projection section 5. The robot system 1 can thus calculate the target object position/attitude with accuracy by using the active stereoscopy method based on one of the first imaging section 11 and the second imaging section 12 and the projection section 5 instead of using the stereoscopy method even when the target object O has a hidden portion that cannot be imaged by one of the first imaging section 11 and the second imaging section 12.

Having calculated the target object position/attitude, the robot system 1 causes, for example, the robot 20 to grip the target object O based on the calculated target object position/attitude. The robot system 1 then causes the robot 20 to place the target object O in a predetermined placement position X that is not shown. In the following description, the series of action from the stereoscopic imaging of the target object O using the first imaging section 11 and the second imaging section 12 after the calibration to the placement of the target object O in the placement position X is referred to as a predetermined action for ease of description.

The projection section 5 is, for example, a projector including a liquid crystal light valve, a projection lens, a liquid crystal driver, a light source, such as an ultrahigh-pressure mercury lamp and a metal halide lamp, for projecting a projection image. The projection section 5 is connected to the controller 30, for example, via a cable so that they can communicate with each other. The wired communication via a cable is established based, for example, on the Ethernet (registered trademark) or USB (universal serial bus) standard.

The projection section 5 and the controller 30 may instead be connected to each other by using wireless communication established based on the Wi-Fi (registered trademark) or any other communication standard. The projection section 5 acquires a variety of images from the controller 30 by means of communication and projects the variety of acquired images as projection images in the projection range P1. In FIG. 1, the projection section 5 is so installed that the imaging range P2 falls within the projection range P1, but the size of the projection range P1 and the size of the imaging range P2 may be reversed, or the projection range P1 and the imaging range P2 may overlap with each other.

The first imaging section 11 is, for example, a camera including a CCD (charge coupled device) or a CMOS (complementary metal oxide semiconductor) device, which is an imaging device that converts collected light into an electric signal, and other components. The first imaging section 11 is connected to the controller 30 via a cable so that they can communicate with each other. The wired communication via a cable is established based, for example, on the Ethernet (registered trademark) or USB standard.

The first imaging section 11 and the controller 30 may instead be connected to each other by using wireless communication established based on the Wi-Fi (registered trademark) or any other communication standard. The first imaging section 11 is disposed in a position where it captures an image of a range narrower than the projection range P1 but can capture an image of the imaging range P2 in which a projection image is projected by the projection section 5 and which contains the target object O.

The second imaging section 12 is, for example, a camera including a CCD or a CMOS device, which is an imaging device that converts collected light into an electric signal, and other components. The second imaging section 12 is connected to the controller 30 via a cable so that they can communicate with each other. The wired communication via a cable is established based, for example, on the Ethernet (registered trademark) or USB standard.

The second imaging section 12 and the controller 30 may instead be connected to each other by using wireless communication established based on the Wi-Fi (registered trademark) or any other communication standard. The second imaging section 12 is disposed is a position which differs from the position of the first imaging section 11 and where the second imaging section 12 can capture an image of the imaging range P2 described above.

The robot 20 is, for example, a single-arm robot including a gripper HND, which has claws capable of gripping an object, a manipulator MNP, and a plurality of actuators that are not shown. A single-arm robot refers to a robot having a single arm formed of the gripper HND and the manipulator MNP. The robot system 1 may instead have a configuration including a scalar robot (horizontal multi-articulated robot), a double-arm robot, or any other robot in place of the single-arm robot. A scalar robot is a robot so configured that a manipulator moves only in the horizontal direction and only a sliding shaft at the front end of the manipulator moves upward and downward. A double-arm robot is a robot having two arms each of which is formed of the gripper HND and the manipulator MNP.

The arm of the robot 20 is a six-axis, vertical multi-articulated arm and can move with six-axis degrees of freedom based on coordinated action of a support, the manipulator MNP, and the gripper HND via the actuators.

The arm of the robot 20 may instead move with five (fixe-axis) or less degrees of freedom or seven (seven-axis) or more degrees of freedom. The action of the robot 20 achieved by the arm including the gripper HND and the manipulator MNP will be described below.

The robot 20 is connected to the controller 30, for example, via a cable so that they can communicate with each other. The wired communication via a cable is established based, for example, on the Ethernet (registered trademark) or USB standard. The robot 20 and the controller 30 may instead be connected to each other by using wireless communication established based on the Wi-Fi (registered trademark) or any other communication standard. In the robot system 1, the robot 20 has a configuration in which the robot 20 is connected to the controller 30 disposed external to the robot 20 as shown in FIG. 1, and the configuration may be replaced with a configuration in which the controller 30 is built in the robot 20. The robot 20 acquires a control signal from the controller 30, grips the object O based on the acquired control signal, and places the gripped object O in the placement position X.

The controller 30 selects a projection image one by one from the eight pre-stored images and controls and causes the projection section 5 to project the selected projection image in the projection range P1. After the selected projection image is projected in the projection range P1, the controller 30 controls and causes the first imaging section 11 to capture a still image of the imaging range P2 as a first captured image. Further, the controller 30 controls and causes the second imaging section 12 to capture a still image of the imaging range P2 as a second captured image. The controller 30 repeats the processes described above by the number of projection images (eight in this example) to acquire eight first captured images and eight second captured images.

The controller 30 then performs the calibration for relating the in-plane coordinates in a first captured image to be captured by the first imaging section 11 and the in-plane coordinates in a second captured image to be captured by the second imaging section 12 to each other based on the double phase shift method using the eight first captured images and the eight second captured images. In the following description, the calibration is called inter-imaging-section calibration for ease of description.

It is assumed that the in-plane coordinates in a projection image projected by the projection section 5 and the in-place coordinates in a first captured image captured by the first imaging section 11 have been related to each other by calibration in advance. It is similarly assumed that the in-plane coordinates in a projection image projected by the projection section 5 and the in-place coordinates in a second captured image captured by the second imaging section 12 have been related to each other by the calibration in advance. The calibration differs from the inter-imaging-section calibration described above in terms of type of performed processing.

Having completed the inter-imaging-section calibration, the controller 30 controls and causes the first imaging section 11 and the second imaging section 12 to capture stereoscopic images of the target object O placed on the table TB. The controller 30 then generates a group of three-dimensional points on the target object O by using the active stereoscopy method based on the first and second captured images captured by the imaging sections. The controller calculates the target object position/attitude based on the generated group of three-dimensional points. Having calculated the target object position/attitude, the controller 30, for example, causes the robot 20 to grip the target object O based on the calculated target object position/attitude. The controller 30 then causes the robot 20 to place the target object O in the predetermined placement position X that is not shown. The combination of the projection section 5, the imaging unit 10, and the controller 30 is presented as an example of a control system.

Figure 3:
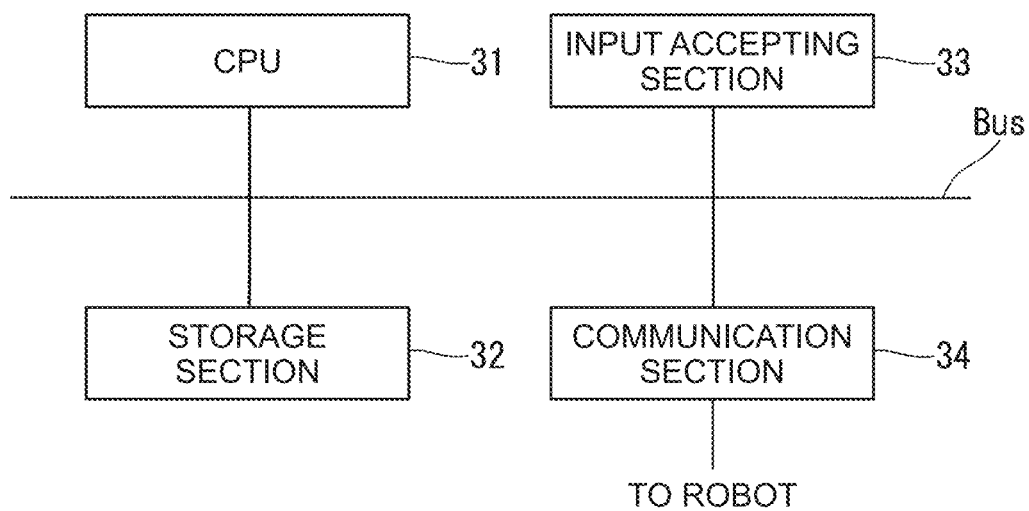
FIG. 3 shows an example of the hardware configuration of a controller.

The hardware configuration of the controller 30 will next be described with reference to FIG. 3. FIG. 3 shows an example of the hardware configuration of the controller 30. The controller 30 includes, for example, a CPU (central processing unit) 31, a storage section 32, an input accepting section 33, and a communication section 34 and communicates with the robot 20 via the communication section 34. The components of the controller 30 are connected to each other via a bus BUS so that they can communicate with each other. The CPU 31 executes a variety of programs stored in the storage section 32.

The storage section 32 includes, for example, an HDD (hard disk drive), an SSD (solid state drive), an EEPROM (electrically erasable programmable read-only memory), a ROM (read-only memory), and a RAM (random access memory) and stores, for example, a variety of types of information, image, and program to be processed by the controller 30 and the eight images (projection images PA and PB) to be projected by the projection section 5. The storage section 32 may not be built in the controller 30 and may instead be an external storage device connected, for example, via a digital input/output port, such as a USB port.

The input accepting section 33 is formed, for example, of a keyboard, a mouse, a touchpad, and other input devices. The input accepting section 33 may instead be allowed to function as a display section configured as a touch panel.

The communication section 34 includes, for example, a digital input/output port, such as a USB port, and an Ethernet (registered trademark) port.

Figure 4:
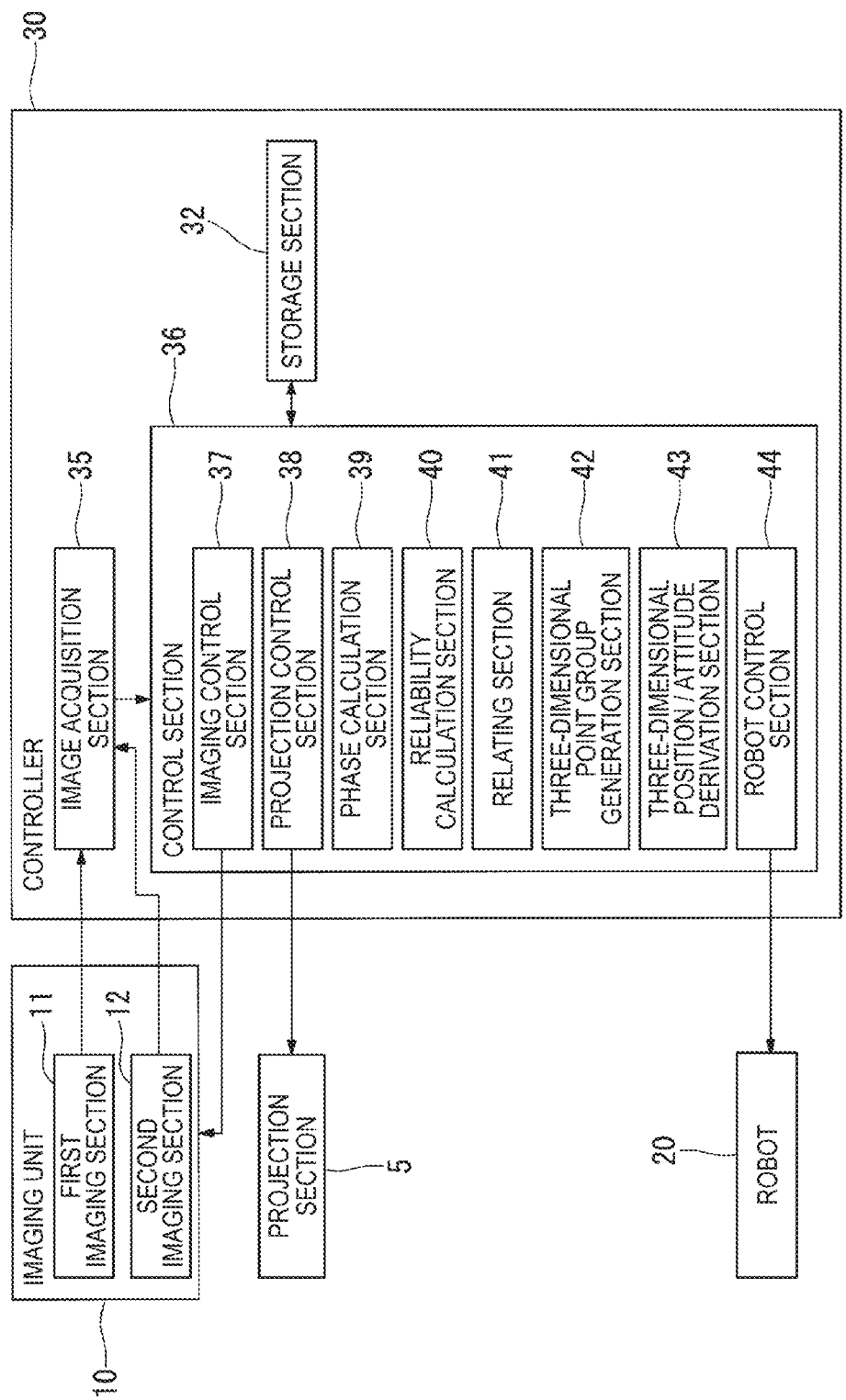
FIG. 4 shows an example of the functional configuration of the controller.

The functional configuration of the controller 30 will next be described with reference FIG. 4. FIG. 4 shows an example of the functional configuration of the controller 30. The controller 30 includes the storage section 32, an image acquisition section 35, and a control section 36. Part or the entirety of functional sections provided in the control section 36 is achieved, for example, by the CPU 31 that executes the variety of programs stored in the storage section 32. Instead, part or the entirety of the functional sections may be hardware functional sections, such as an LSI (large scale integration) circuit and an ASIC (application specific integrated circuit).

The image acquisition section 35 acquires captured images from the imaging unit 10. More specifically, the image acquisition section 35 acquires first captured images from the first imaging section 11. The image acquisition section 35 outputs the acquired first captured images to the control section 36. Similarly, the image acquisition section 35 acquires second captured images from the second imaging section 12. The image acquisition section 35 outputs the acquired second captured images to the control section 36.

The control section 36 controls the entire controller 30. The control section 36 includes an imaging control section 37, a projection control section 38, a phase calculation section 39, a reliability calculation section 40, a relating section 41, a three-dimensional point group generation section 42, a three-dimensional position/attitude derivation section 43, and a robot control section 44.

The imaging control section 37 causes the imaging unit 10 to capture an image of the imaging range P2. More specifically, the imaging control section 37 causes the first imaging section 11 to capture an image of the imaging range P2. The imaging control section 37 further causes the second imaging section 12 to capture an image of the imaging range P2.

The projection control section 38 reads an image from the storage section 32, outputs the read image as a projection image to the projection section 5, and controls and causes the projection section 5 to project the projection image in the projection range P1.

The phase calculation section 39 calculates a phase necessary to relate the in-plane coordinates in a first captured image from the first imaging section 11 to the in-plane coordinates in a projection image from the projection section 5 based on the first captured images 1A0 to 1A3 among the eight first captured images acquired from the image acquisition section 35. The phase in this case is, in a state in which the reference projection image of n=0 (projection image PA0 in this example) among the four projection images PA0 to PA3 shown in FIG. 2 is projected, the phase of the wave representing the periodic change in the luminance at each point identified by the corresponding in-plane coordinate in the projection image. In the following description, the phase calculated based on the first captured images associated with the projection images PA is referred to as a first A phase $\theta 1A$.

Further, the phase calculation section 39 calculates a phase necessary to relate the in-plane coordinates in a first captured image from the first imaging section 11 to the in-plane coordinates in a projection image from the projection section 5 based on the first captured images 1B0 to 1B3 among the eight first captured images acquired from the image acquisition section 35. The phase in this case is, in a state in which the reference projection image of n=0 (projection image PB0 in this example) among the four projection images PB0 to PB3 is projected, the phase of the wave representing the periodic change in the luminance at each point identified by the corresponding in-plane coordinate in the projection image. In the following description, the phase calculated based on the first captured images associated with the projection images PB is referred to as a first B phase $\phi 1B$.

Further, the phase calculation section 39 calculates a phase necessary to relate the in-plane coordinates in a second captured image from the second imaging section 12 to the in-plane coordinates in a projection image from the projection section 5 based on the second captured images 2A0 to 2A3 among the eight second captured images acquired from the image acquisition section 35. The phase in this case is, in a state in which the reference projection image of n=0 (projection image PA0 in this example) among the four projection images PA0 to PA3 is projected, the phase of the wave representing the periodic change in the luminance at each point identified by the corresponding in-plane coordinate in the projection image. In the following description, the phase calculated based on the second captured images associated with the projection images PA is referred to as a second A phase $\theta 2A$.

Further, the phase calculation section 39 calculates a phase necessary to relate the in-plane coordinates in a second captured image from the second imaging section 12 to the in-plane coordinates in a projection image from the projection section 5 based on the second captured images 2B0 to 2B3 among the eight second captured images acquired from the image acquisition section 35. The phase in this case is, in a state in which the reference projection image of n=0 (projection image PB0 in this example) among the four projection images PB0 to PB3 is projected, the phase of the wave representing the periodic change in the luminance at each point identified by the corresponding in-plane coordinate in the projection image. In the following description, the phase calculated based on the second captured images associated with the projection images PB is referred to as a second B phase $\phi 2B$.

The reliability calculation section 40 calculates reliability that serves as an index representing the probability of coincidence of the position identified by a certain in-plane coordinate in a first captured image and the position identified by each in-plane coordinate in a second captured image based on the first A phase $\theta 1A$, the first B phase $\phi 1B$, the second A phase $\theta 2A$, and the second B phase $\phi 2B$ calculated by the phase calculation section 39. In the following description, a certain in-plane coordinate N in a second captured image that identifies the position identified by a certain in-plane coordinate M in a first captured image is referred to as an in-plane coordinate N in a second captured image that corresponds to an in-plane coordinate M in a first captured image for ease of description. The reliability calculation section 40 repeats the reliability calculation process to calculate the reliabilities of the coincidence of each of the coordinates in the first captured image and each of the coordinates in the second captured image based on the first A phase $\theta 1A$, the first B phase $\phi 1B$, the second A phase $\theta 2A$, and the second B phase $\phi 2B$ calculated by the phase calculation section 39.

The relating section 41 detects an in-plane coordinate in the second captured image that corresponds to each of the in-plane coordinates in the first captured image based on the reliabilities calculated by the reliability calculation section 40. The relating section 41 then performs the inter-imaging-section calibration by relating the detected in-plane coordinate in the second captured image that corresponds to each of the in-plane coordinates in the first captured image to the in-plane coordinate in the first captured image.

More specifically, based on the reliabilities calculated by the reliability calculation section 40 and representing the coincidence of each of the in-plane coordinates in the first captured image and each of the in-plane coordinates in the second captured image, the relating section 41 detects, for each of the in-plane coordinates in the first captured image, a combination showing the highest reliability among the combinations of the in-plane coordinate in the first captured image and the in-plane coordinate in the second captured image. The relating section 41 then performs the inter-imaging-section calibration by relating, for each of the in-plane coordinates in the first captured image, two coordinates (that is, an in-plane coordinate in the first captured image and an in-plane coordinate in the second captured image) associated with the combination showing the highest reliability, among the combinations of the in-plane coordinates in the first captured image and the in-plane coordinates in the second captured image, to each other.

The three-dimensional point group generation section 42 generates a group of three-dimensional points on the target object O based on captured stereoscopic images captured by the first imaging section 11 and the second imaging section 12 and acquired from the image acquisition section 35.

The three-dimensional position/attitude derivation section 43 calculates the target object position/attitude based on the group of three-dimensional points on the target object O that have been generated by the three-dimensional point group generation section 42.

The robot control section 44 controls and causes the robot 20 to grip the target object O with the gripper HND based on the target object position/attitude calculated by the three-dimensional position/attitude derivation section 43. After the robot 20 grips the target object O with the gripper HND, the robot control section 44 controls and causes the robot 20 to place the target object O in the placement position X.

Figure 5:
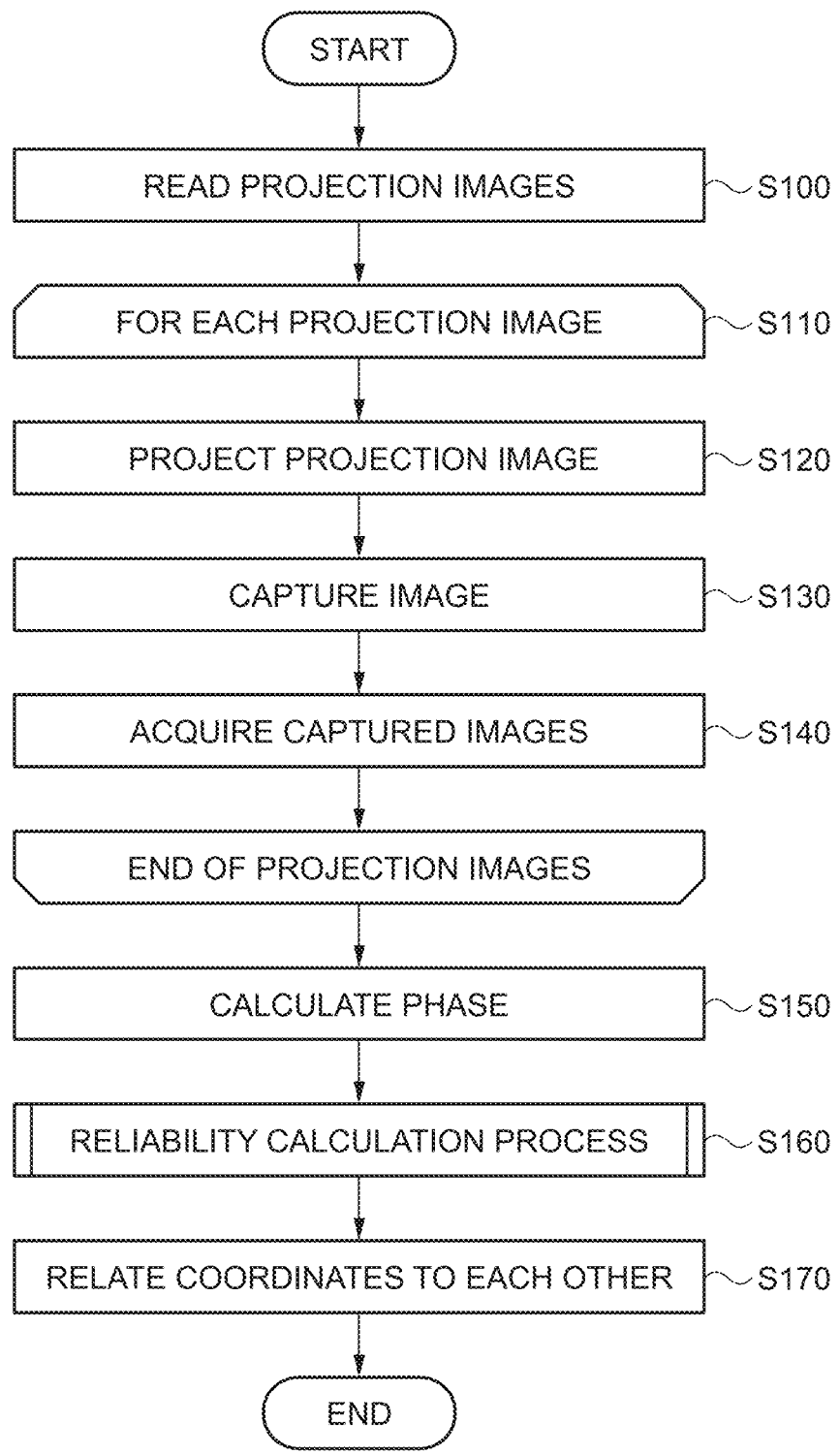
FIG. 5 is a flowchart showing an example of the procedure of processes carried out by the controller to complete inter-imaging-section calibration.

Processes carried out by the controller 30 to complete the inter-imaging-section calibration will be described below with reference to FIG. 5. FIG. 5 is a flowchart showing an example of the procedure of processes carried out by the controller 30 to complete the inter-imaging-section calibration. The projection control section 38 first reads the eight images prestored in the storage section 32 (that is, four projection images PA and four projection images PB described above) from the storage section 32 (step S100).

The projection control section 38 then selects a projection image one by one from the read projection images, causes the selected projection image to undergo the processes in steps S120 to S140, and repeats the steps for each of the read projection images (step S110). The projection control section 38 selects a projection image one by one from the four projection images PA and then selects a projection image one by one from the four projection images PB. It is, however, noted that the projection control section 38 may instead select a projection image in a different order.

After a projection image is selected in step S110, the projection control section 38 controls and causes the projection section 5 to project the selected projection image in the projection range P1 (step S120). The imaging control section 37 then controls and causes each of the first imaging section 11 and the second imaging section 12 to capture an image of the imaging range P2 (step S130). The imaging control section 37 may control and cause one of the first imaging section 11 and the second imaging section 12 to perform the image capturing before the other or may control and cause the first imaging section 11 and the second imaging section 12 to perform the image capturing simultaneously.

The image acquisition section 35 then acquires the first captured image from the first imaging section 11 and acquires the second captured image from the second imaging section 12 (step S140). The image acquisition section 35 then outputs the first captured image and the second captured image acquired from the first imaging section 11 and the second imaging section 12 to the control section 36.

After the processes in steps S110 to S140, which cause the eight first captured images and the eight second captured images to be outputted to the control section 36, the phase calculation section 39 calculates a phase necessary to relate the in-plane coordinates in the first captured images from the first imaging section 11 and the in-plane coordinates in the projection images from the projection section 5 to each other based on the eight acquired first captured images and further calculates a phase necessary to relate the in-plane coordinates in the second captured images from the second imaging section 12 and the in-plane coordinates in the projection images from the projection section 5 to each other based on the eight acquired second captured images (step S150).

More specifically, based on the first captured images 1A0 to 1A3 among the eight acquired first captured images, the phase calculation section 39 calculates the phase at each in-plane coordinate in the first captured images at the time when the first captured image 1A0 is projected by using the phase shift method. In the following description, the phases at the in-plane coordinates in the first captured image at the time when the first captured image 1A0 is captured are collectively referred to as the first A phase θ1A.

Similarly, based on the first captured images 1B0 to 1B3 among the eight acquired first captured images, the phase calculation section 39 calculates the phase at each in-plane coordinate in the first captured image at the time when the first captured image 1B0 is projected. In the following description, the phases at the in-plane coordinates in the first captured image at the time when the first captured image 1B0 is captured are collectively referred to as the first B phase ϕ1B.

Similarly, based on the second captured images 2A0 to 2A3 among the eight acquired second captured images, the phase calculation section 39 calculates the phase at each in-plane coordinate in the second captured image at the time when the second captured image 2A0 is projected. In the following description, the phases at the in-plane coordinates in the second captured image at the time when the second captured image 2A0 is captured are collectively referred to as the second A phase θ2A.

Similarly, based on the second captured images 2B0 to 2B3 among the eight acquired second captured images, the phase calculation section 39 calculates the phase at each in-plane coordinate in the second captured image at the time when the second captured image 2B0 is captured. In the following description, the phases at the in-plane coordinates in the second captured image at the time when the second captured image 2B0 is projected are collectively referred to as the second B phase ϕ2B.

After the phases are calculated by the phase calculation section 39 in step S150, the reliability calculation section 40 performs the reliability calculation process of calculating the reliability that serves as an index representing the probability of coincidence of the position identified by a certain in-plane coordinate in a first captured image and the position identified by each in-plane coordinate in a second captured image based on the first A phase θ1A, the first B phase ϕ1B, the second A phase θ2A, and the second B phase ϕ2B calculated by the phase calculation section 39 in step S150 (step S160). In the reliability calculation process, the reliability calculation section 40 repeats the reliability calculation process to calculate the reliabilities of the coincidence of each of the in-plane coordinates in the first captured image and each of the in-plane coordinates in the second captured image based on the first A phase θ1A, the first B phase ϕ1B, the second A phase θ2A, and the second B phase ϕ2B calculated by the phase calculation section 39. The first A phase θ1A and the first B phase ϕ1B are examples of a first phase, and the second A phase θ2A and the second B phase ϕ2B are examples of a second phase.

The relating section 41 then, based on the reliabilities calculated by the reliability calculation section 40 in step S160 and representing the coincidence of each of the in-plane coordinates in the first captured image and each of the in-plane coordinates in the second captured image, performs the inter-imaging-section calibration described above by relating, for each of the in-plane coordinates in the first captured image, coordinates associated with the combination showing the highest reliability, among the combinations of the in-plane coordinates in the first captured image and the in-plane coordinates in the second captured image, to each other (step S170).

Figure 6:
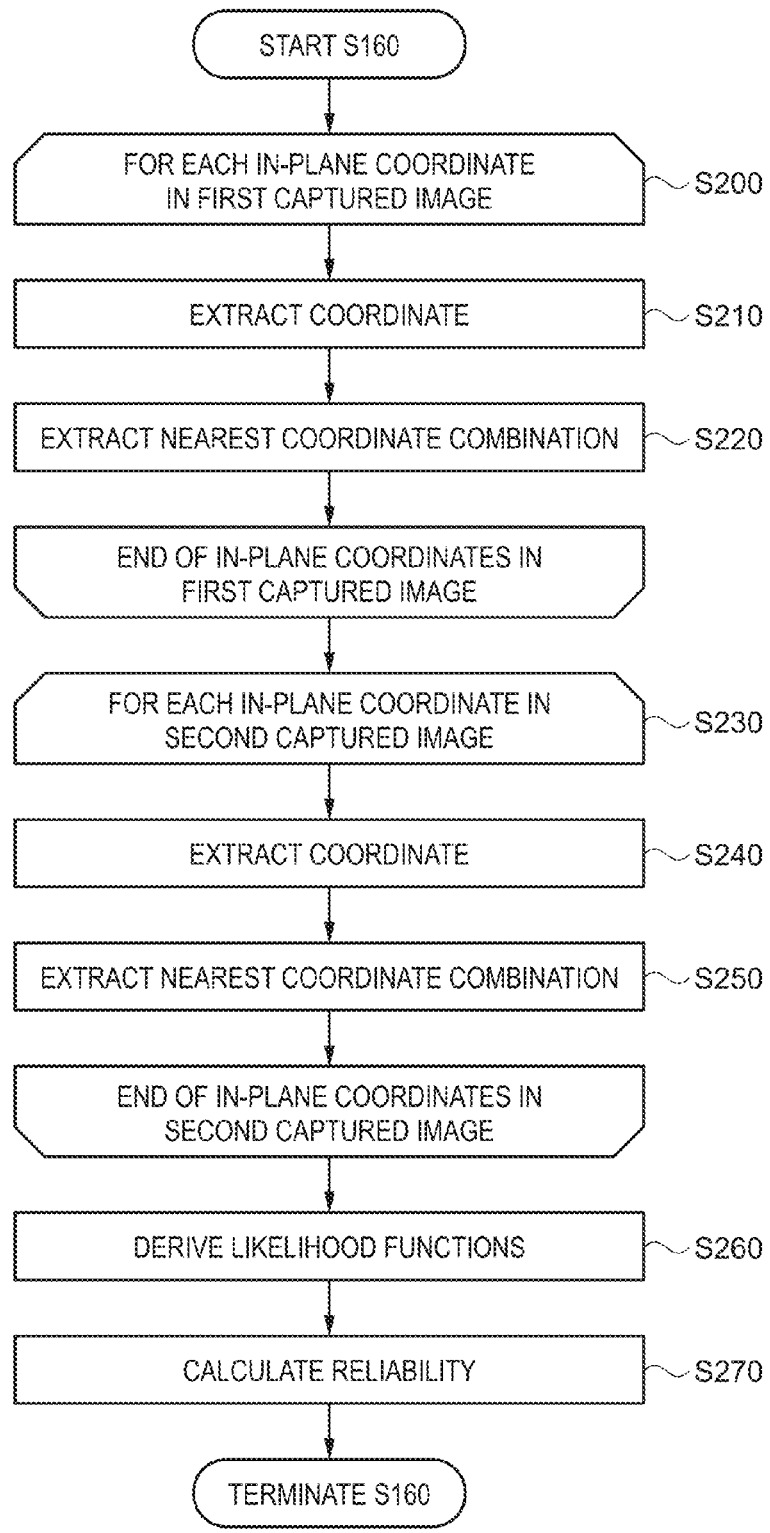
FIG. 6 is a flowchart showing an example of the procedure of a reliability calculation process carried out by a reliability calculation section.

The reliability calculation process carried out by the reliability calculation section 40 will be described with reference to FIG. 6. FIG. 6 is a flowchart showing an example of the procedure of the reliability calculation process carried out by the reliability calculation section 40. A brief description of the reliability calculation process will first be made. In the reliability calculation process, the reliability calculation section 40 calculates the reliability described above based on nearest combination coordinates extracted in steps S200 to S220 and nearest combination coordinates extracted in steps S230 to S250.

The reliability calculation section 40 first selects an in-plane coordinate one by one from those in a first captured image, causes the selected coordinate to undergo the processes in steps S210 to S220, and repeats the steps for each of the in-plane coordinates (step S200). Having selected one in-plane coordinate in the first captured image in step S200, the reliability calculation section 40 extracts the in-plane coordinate in the projection image that corresponds to the point identified by the selected coordinate (step S210). More specifically, the reliability calculation section 40 extracts an in-plane X coordinate that identifies a point in the projection image PA0 that has the same phase as the first A phase $\theta1A$ at the point in the first captured image 1A0 that is identified by the selected coordinate (that is, the in-plane coordinate in the projection image that corresponds to the point identified by the selected coordinate described above). In the following description, the extracted coordinates are referred to as coordinates $X1\_\theta1A$ to $X4\_\theta1A$, and only the four coordinates are extracted for ease of description, but a larger number of coordinates are practically extracted.

It is assumed that the phase at each in-plane X coordinate in the projection image PA0 has been calculated in advance by using the projection images PA with the aid of the phase shift method. Since the wave representing the periodic change in luminance in each of the projection images PA is a plane wave traveling in the horizontal direction in the plane of the projection image, the reliability calculation section 40 extracts in-plane X coordinates in the projection image. Instead, the reliability calculation section 40 may extract coordinates along another coordinate axis in accordance with the traveling direction of the wave representing the periodic change in luminance in each of the projection images PA.

Similarly, the reliability calculation section 40 extracts an in-plane X coordinate in the projection image that identifies a point in the plane of the projection image PB0 that has the same phase as the first B phase $\phi1B$ at the point in the first captured image 1B0 that is identified by the selected coordinate (that is, the in-plane coordinate in the projection image that corresponds to the point identified by the selected coordinate described above). In the following description, the extracted coordinates are referred to as coordinates $X5\_\phi1B$ to $X7\_\phi1B$, and only the three coordinates are extracted for ease of description, but a larger number of coordinates are practically extracted.

Having arranged the X coordinates $X1\_\theta1A$ to $X4\_\theta1A$ and the X coordinates $X5\_\phi1B$ to $X7\_\phi1B$ extracted in step S210 in the order of magnitude of the X coordinate, the reliability calculation section 40 extracts a combination of nearest X coordinates formed of any one of the X coordinates $X1\_\theta1A$ to $X4\_\theta1A$ and any one of the X coordinates $X5\_\phi1B$ to $X7\_\phi1B$ (step S220).

The extraction process will be described with reference to FIGS. 7A and 7B. FIGS. 7A and 7B describe the process in step S220 carried out by the reliability calculation section 40. FIG. 7A shows an example of a graph of the extracted X coordinates $X1\_\theta1A$ to $X4\_\theta1A$ and the extracted X coordinates $X5\_\phi1B$ to $X7\_\phi1B$ arranged and plotted in the order of magnitude of the coordinate along a coordinate axis XP, which represents the in-plane X coordinate in a projection image.

From the graph shown in FIG. 7A, the reliability calculation section 40 extracts a combination of adjacent X coordinates formed of any one of the X coordinates $X1\_\theta1A$ to $X4\_\theta1A$ and any one of the X coordinates $X5\_\phi1B$ to $X7\_\phi1B$. In FIG. 7A, the reliability calculation section 40 extracts the following six combinations: the X coordinate $X1\_\theta1A$ and the X coordinate $X5\_\phi1B$; the X coordinate $X5\_\phi1B$ and the X coordinate $X2\_\theta1A$; the X coordinate $X2\_\theta1A$ and the X coordinate $X6\_\phi1B$; the X coordinate $X6\_\phi1B$ and the X coordinate $X3\_\theta1A$; the X coordinate $X3\_\theta A$ and the X coordinate $X7\_\phi1B$; and the X coordinate $X7\_\phi1B$ and the X coordinate $X4\_\theta1A$. The reliability calculation section 40 then calculates, for each of the extracted combinations, the length of the X-coordinate segment associated with the extracted combination (that is, the length of each of segments L1 to L6 in FIG. 7A).

The reliability calculation section 40 extracts a combination of X coordinates forming the shortest segment based on the calculated lengths (the combination of the X coordinate $X7\_\phi1B$ and the X coordinate $X4\_\theta1A$ forming the segment L6 in this example) as the combination of nearest X coordinates. In the following description, the process of extracting a combination of nearest X coordinates (hereinafter referred to as nearest combination coordinates) is referred to as a nearest coordinate combination extraction process for ease of description.

In the following description, the length of the segment associated with the nearest combination coordinates extracted in the nearest coordinate combination extraction process in step S220 is expressed by $L\_1(XA)$. The argument XA is the X coordinate along the coordinate axis XP that represents the position of the segment associated with the length $L\_1(XA)$ and is, for example, the average of the two X coordinates associated with the combination of nearest X coordinates. For example, $L\_1(XA)=L\_1(X7\_\phi1B+X4\_\theta1A)/2$ in this example.

As described above, the reliability calculation section 40 repeats the processes in steps S200 to S220 to cause the in-plane coordinates in the first captured images to undergo the nearest coordinate combination extraction process.

The reliability calculation section 40 then selects an in-plane coordinate one by one from those in a second captured image, causes the selected coordinate to undergo the processes in steps S240 to S250, and repeats the steps for each of the in-plane coordinates (step S230).

Having selected one in-plane coordinate in the second captured image in step S230, the reliability calculation section 40 extracts the in-plane coordinate in the projection image that corresponds to the point identified by the selected coordinate (step S240). More specifically, the reliability calculation section 40 extracts an in-plane X coordinate in the projection image that identifies a point in the projection image PA0 that has the same phase as the second A phase $\theta2A$ at the point in the second captured image 2A0 that is identified by the selected coordinate (that is, the in-plane coordinate in the projection image that corresponds to the point identified by the selected coordinate described above). In the following description, the extracted X coordinates are referred to as X coordinates $X8\_\theta2A$ to $X11\_\theta2A$, and only the four coordinates are extracted for ease of description, but a larger number of X coordinates are practically extracted.

It is assumed that the phase at each in-plane X coordinate in the projection image PA0 has been calculated in advance by using the projection images PA with the aid of the phase shift method. Since the wave representing the periodic change in luminance in each of the projection images PA is a plane wave traveling in the horizontal direction in the plane of the projection image, the reliability calculation section 40 extracts in-plane X coordinates in the projection image. Instead, the reliability calculation section 40 may extract coordinates along another coordinate axis in accordance with the traveling direction of the wave representing the periodic change in luminance in each of the projection images PA.

Similarly, the reliability calculation section 40 extracts an in-plane X coordinate in the projection image that identifies a point in the projection image PB0 that has the same phase as the second B phase $\phi 2B$ at the point in the second captured image 2B0 that is identified by the selected coordinate (that is, the in-plane coordinates in the projection image that corresponds to the point identified by the selected coordinate described above). In the following description, the extracted X coordinates are referred to as X coordinates X12_$\phi$2B to X14_$\phi$2B, and only the three coordinates are extracted for ease of description, but a larger number of coordinates are practically extracted.

Having arranged the X coordinates X8_$\theta$2A to X11_$\theta$2A and the X coordinates X12_$\phi$2B to X14_$\phi$2B extracted in step S240 in the order of magnitude of the coordinate, the reliability calculation section 40 performs the nearest coordinate combination extraction process of extracting a combination of nearest X coordinates formed of any one of the X coordinates X8_$\theta$2A to X11_$\theta$2A and any one of the X coordinates X12_$\phi$2B to X14_$\phi$2B (step S250).

The nearest coordinate combination extraction process in step S250 will be described with reference to FIGS. 7A and 7B again. FIG. 7B shows an example of a graph of the extracted X coordinates X8_$\theta$2A to X11_$\theta$2A and the extracted X coordinates X12_$\phi$2B to X14_$\phi$2B arranged and plotted in the order of magnitude of the coordinate along the coordinate axis XP, which represents the in-plane X coordinate in a projection image. The graph shown in FIG. 7A and the graph shown in FIG. 7B have the same origin, and the graph shown in FIG. 7A and the graph shown in FIG. 7B can therefore be compared with each other in terms of the position along the coordinate axis XP, which represents the in-plane X coordinate in a projection image.

From the graph shown in FIG. 7B, the reliability calculation section 40 extracts a combination of adjacent X coordinates formed of any one of the X coordinates X8_$\theta$2A to X11_$\theta$2A and any one of the X coordinates X12_$\phi$2B to X14_$\phi$2B. In FIG. 7B, the reliability calculation section 40 extracts the following six combinations: the X coordinate X8_$\theta$2A and the X coordinate X12_$\phi$2B; the X coordinate X12_$\phi$2B and the X coordinate X9_$\theta$2A; the X coordinate X9_$\theta$2A and the X coordinate X13_$\phi$2B; the X coordinate X13_$\phi$2B and the X coordinate X10_$\theta$2A; the X coordinate X10_$\theta$2A and the X coordinate X14_$\phi$2B; and the X coordinate X14_$\phi$2B and the X coordinate X11_$\theta$2A. The reliability calculation section 40 then calculates, for each of the extracted combinations, the length of the X-coordinate segment associated with the extracted combination (that is, the length of each of segments L7 to L12 in FIG. 7B).

The reliability calculation section 40 extracts a combination of X coordinates forming the shortest segment based on the calculated lengths (the combination of the X coordinate X14_$\phi$2B and the X coordinate X11_$\theta$2A forming the segment L12 in this example) as the nearest combination coordinates. In the extraction process, when the length of a segment associated with extracted nearest combination coordinates is greater than a predetermined threshold $\epsilon$, the reliability calculation section 40 discards the extracted nearest combination coordinates and returns to step S230, where the reliability calculation section 40 selects in-plane coordinates in the next second captured image.

In the following description, the length of the segment associated with the nearest combination coordinates extracted in the nearest coordinate combination extraction process in step S250 is expressed by L_2(XA). The argument XA is the same as that in the length L_1(XA) and will not be described.

As described above, the reliability calculation section 40 repeats the processes in steps S230 to S250 to cause the in-plane coordinates in the second captured images to undergo the nearest coordinate combination extraction process.

When the position identified by the in-plane coordinate in one of the first captured images and associated with the segment L6 shown in FIG. 7A coincides with the position identified by the in-plane coordinate in one of the second captured images and associated with the segment L12 shown in FIG. 7B, the segment L6 and the segment L12 should coincide with each other along the coordinate axis XP. This is, however, the case when a variety of errors are not present. In general, even when the position identified by the in-plane coordinate in one of the first captured images and associated with the segment L6 coincides with the position identified by the in-plane coordinate in one of the second captured images and associated with the segment L12, a variety of errors typically prevent the segment L6 and the segment L12 from coinciding with each other along the coordinate axis XP but cause them to shift from each other, as shown in FIGS. 7A and 7B.

Even when an error causes the shift to occur, but when the position identified by the in-plane coordinate in one of the first captured images and associated with the segment L6 shown in FIG. 7A coincides with the position identified by the in-plane coordinate in one of the second captured images and associated with the segment L12 shown in FIG. 7B, the segment L6 and the segment L12 overlap or coincide with each other along the coordinate axis XP or are likely to be adjacent to each other. In view of the fact described above, the reliability calculation section 40 carries out the processes in steps S260 to S270 to calculate the reliability representing an index of probability of coincidence of the position identified by the in-plane coordinate in one of the first captured images and associated with the segment extracted in step S220 (segment associated with length L1_(XA)) and the position identified by the in-plane coordinate in one of the second captured images based on the segment L_1 (XA) and the segment L_2(XA).

Based on the length L_1 (XA) of the segment associated with each in-plane coordinate in one of the first captured images and calculated in step S220, the reliability calculation section 40 then derives a likelihood function P_1(XA) associated with the in-plane coordinate in the first captured image. Similarly, based on the length L_2(XA) of the segment associated with each in-plane coordinate in one of the second captured images and calculated in step S250, the reliability calculation section 40 derives a likelihood function P_2(XP) associated with the in-plane coordinate in the second captured image. The likelihood functions P_1(XP) and P_2(XP) will be described below.

Since the two in-plane coordinates in one of the first captured images that are associated with the segment length L_1 (XA) calculated in step S220 form a combination obtained from the phase associated with the same in-plane coordinate in the first captured image, in an ideal environment in which there is no error in the calibration between the first imaging section 11 and the projection section 5 or no error in the calculation in the phase shift method, the length L_1 (XA) of the segment associated with the combination should be zero, that is, the detected positions should coincide with each other. Now, call detected positions that coincide with each other in the ideal environment a true position, and it is highly probable that the true position falls within the segment associated with the calculated length L_1(XA). A probability density function representing the probability is the likelihood function P_1(XP).

Similarly, since the two in-plane coordinates in one of the second captured images that are associated with the segment length L_2(XA) calculated in step S250 form a combination obtained from the phase associated with the same in-plane coordinate in the second captured image, in the ideal environment, in which there is no error in the calibration between the second imaging section 12 and the projection section 5 or no error in the calculation in the phase shift method, the length L_2(XA) of the segment associated with the combination should be zero, that is, the detected positions should coincide with each other. Similarly, call detected positions that coincide with each other in the ideal environment a true position, and it is highly probable that the true position falls within the segment associated with the calculated length L_2(XA). A probability density function representing the probability is the likelihood function P_2(XP).

The likelihood functions P_1(XP) and P_2(XP), each of which is a probability density function, satisfy the conditions expressed by the following Expressions (1) and (2).

$$\int_0^{XL} dXP[P\_i(XP)] = 1 \tag{1}$$

$$P\_i(XP) > 0 \tag{2}$$

In the expressions, i=1, 2; XP represents the X coordinate along the coordinate axis XP; and the interval of the integration 0 to XL represents the entire in-plane X-coordinate interval in a projection image. Expression (1) represents a condition that requires the sum of the probabilities across the entire interval described above to be one. Expression (2) is a condition that requires any of the probabilities to be a positive constant. Further, the likelihood functions P_1(XP) and P_2(XP) can, for example, be so derived that they satisfy not only Expressions (1) and (2) described above but also an additional condition. In the present embodiment, as an example of the derivation of the likelihood functions under an additional condition, the description will be made of a case where the likelihood functions P_1(XP) and P_2(XP) are so used that they satisfy the following Expressions (3) and (4), but the likelihood functions P_1(XP) and P_2(XP) may instead be so used that they satisfy other conditions. The likelihood function P_1(XP) is an example of a first likelihood function. The likelihood function P_2(XP) is an example of a second likelihood function.

$$XA = \int_0^{XL} dXP[XP \times P\_i(XP)] = \frac{1}{2}(X11 + X12) \tag{3}$$

$$P(X_j) \geq P(X_k) \text{ for } \forall X_j, X_k \text{ and } |X_j - XA| \leq |X_k - XA| \tag{4}$$

In the expressions, X11 and X12 represent two in-plane coordinates in an i-th captured image that are associated with a segment L_i(XA), where i=1, 2, and j and k are subscripts representing J-th and K-th X coordinates, respectively. Expression (3) is a condition that requires the probability of the true position described above present in the calculated segment L_2(XA) to be maximized. Expression (4) is a condition that requires the probability of the presence of the true position described above to lower when the true position is separate from the coordinate XA representing the center of the calculated segment L_2(XA).

Figure 8:
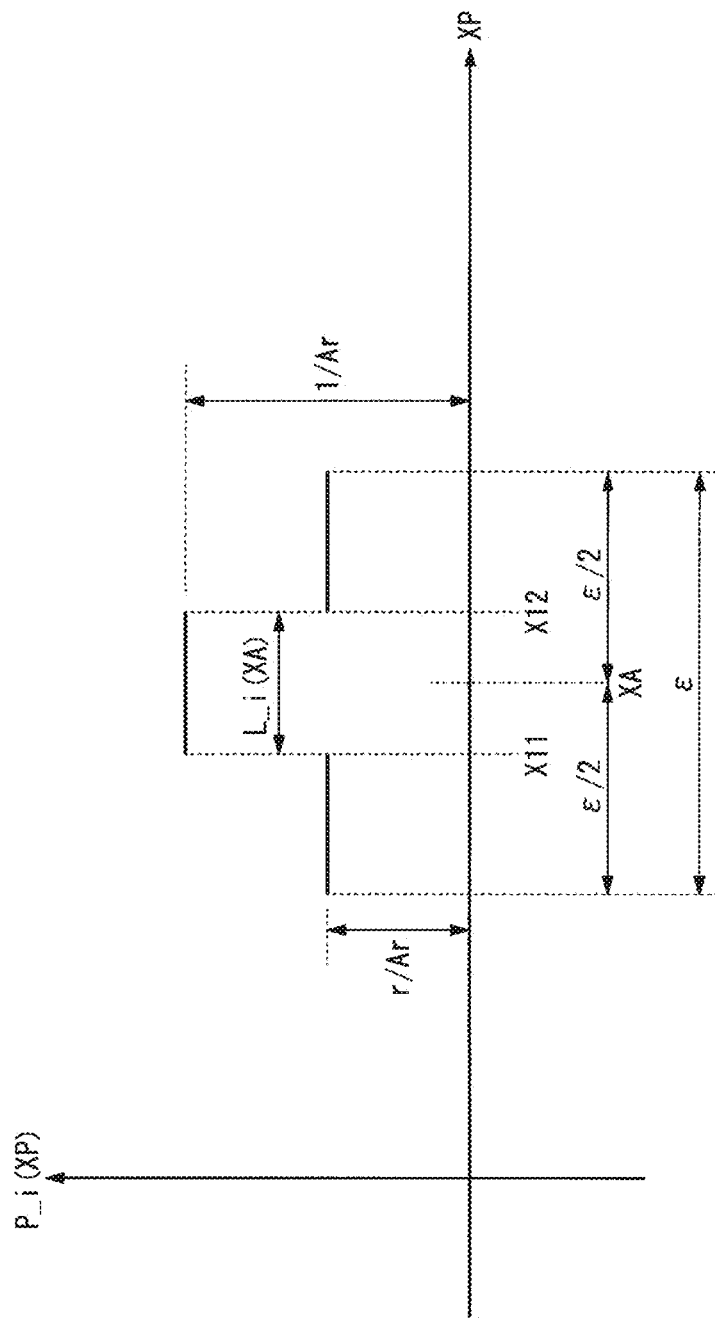
FIG. 8 shows an example of the function form of a likelihood function.

The reliability calculation section 40 derives a function having, for example, the function form shown in FIG. 8 as each of the likelihood functions P_1(XP) and P_2(XP) that satisfy the conditions expressed by Expressions (1) to (4) described above. FIG. 8 shows an example of the function form of the likelihood functions. As shown in FIG. 8, the function form of each of the likelihood functions P_1(XP) and P_2(XP) is expressed by the functional form of a step function. The likelihood function P_i(XP) is a step function having values only within the range of the threshold $\epsilon$ described above, specifically, a step function that has the highest value within the range of the segment represented by the threshold $\epsilon$ but inside the segment associated with the length L_i(XA) shown in FIGS. 7A and 7B. In FIG. 8, r represents a factor that determines the value of the likelihood function outside the segment associated with the length L_i(XA) but inside the segment represented by the threshold $\epsilon$. The factor r is a value registered in advance in the control section 36 but may instead be a value that can be registered by a user. Ar is a factor that determines the value of the likelihood function inside the segment L_i(XA) and is calculated from Ar=L_i(XA)+r($\epsilon$-L_i(XA)) based on Expression (3) described above.

After the likelihood function P_1(XP) associated with each in-plane coordinate in one of the first captured images and the likelihood function P_2(XP) associated with each in-plane coordinate in one of the second captured images are derived in step S260, the reliability calculation section 40 selects an in-plane coordinate one by one from those in the first captured image and calculates, for each of the selected coordinates, all reliabilities C (r1, r2) of the coincidence of the selected coordinate and each in-plane coordinate in all the second captured images based on the following Expression (5).

$$C(r_1, r_2) = \int_0^{XL} dXP[P\_1(XP) \times P\_2(XP)] \tag{5}$$

In the expression, r1 represents an in-plane coordinate in a first captured image, and r2 represents an in-plane coordinate in a second captured image. The reliability C(r1, r2) in Expression (5) described above is a correlation function between the likelihood function associated with the selected in-plane coordinate in one of the first captured images and the likelihood function associated with each in-plane coordinate in all the second captured images. That is, the position identified by the in-plane coordinate in one of the second captured images where the reliability C(r1, r2) is maximized most probably indicates the position identified by the selected in-plane coordinate in the first captured image. From the reason described above, in step S170, the relating section 41 can perform the inter-imaging-section calibration by relating the position identified by the in-plane coordinate in one of the second captured images where the reliability C(r1, r2) is maximized to the selected in-plane coordinate in the first captured image.

Figure 9:
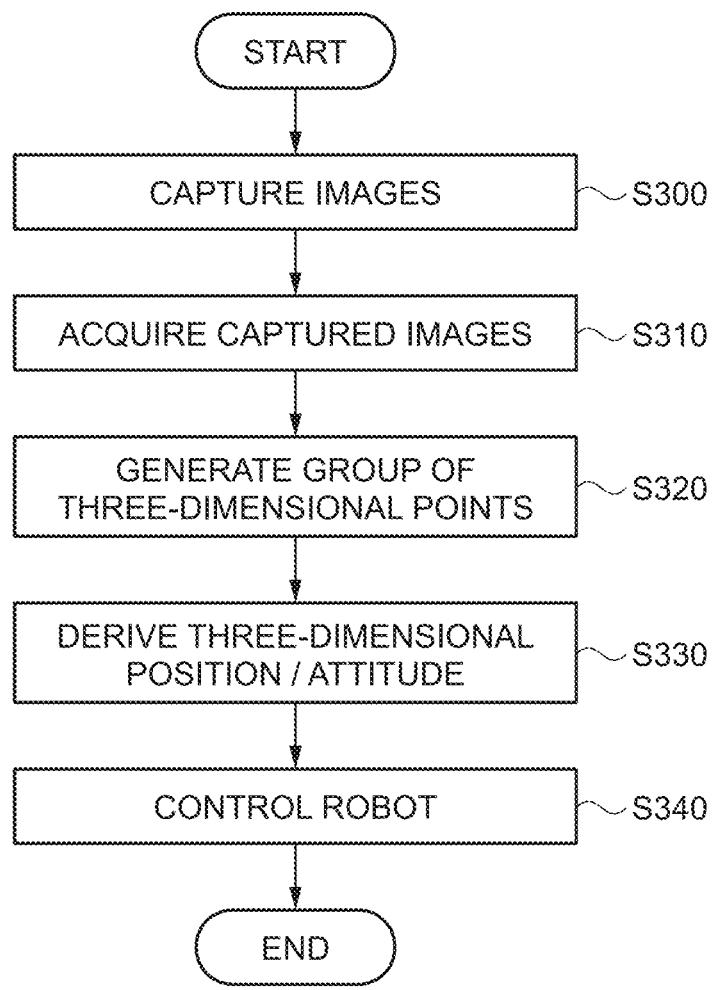
FIG. 9 is a flowchart showing an example of the procedure of processes carried out by the controller to cause a robot to perform a predetermined action.

Processes carried out by the controller 30 to cause the robot 20 to perform the predetermined action will be described below with reference to FIG. 9. FIG. 9 is a flowchart showing an example of the procedure of the processes carried out by the controller 30 to cause the robot 20 to perform the predetermined action. The following description will be made assuming that the processes in the flowcharts shown in FIGS. 5 and 6 have been carried out and the inter-imaging-section calibration has hence been completed. The imaging control section 37 first controls and causes the imaging unit 10 to capture stereoscopic images of the imaging range P2 containing the target object O (step S300).

The image acquisition section 35 then acquires first and second stereoscopically captured images from the imaging unit 10 that has captured them (step S310). The three-dimensional point group generation section 42 then generates a group of three-dimensional points on the target object O based on the first and second captured images acquired from the image acquisition section 35 in step S310 (step S320). The three-dimensional position/attitude derivation section 43 then calculates the target object position/attitude based on the group of three-dimensional points on the target object O generated by the three-dimensional point group generation section 42 in step S320 (step S330).

The robot control section 44 then controls and causes the robot 20 to grip the target object O with the gripper HND based on the target object position/attitude calculated by the three-dimensional position/attitude derivation section 43 in step S330. The robot control section 44 then controls and causes the robot 20 to place the target object O gripped with the gripper HND in the predetermined placement position X (step S340).

As described above, the robot system 1 in the present embodiment projects a projection image on the target object O, causes the first imaging section 11 to capture an image of the target object O on which the projection image is projected by the projection section 5, causes the second imaging section 12, which is disposed in a position different from the position where the first imaging section 11 is disposed, to capture an image of the target object O on which the projection image is projected by the projection section 5, and calculates the three-dimensional position and the attitude of the target object O based on a first point in a first captured image captured by the first imaging section 11 and a second point in a second captured image captured by the second imaging section 12. The robot system 1 can thus measure a variety of three-dimensional shapes.

Further, the robot system 1 calculates, based on the first captured image and the second captured image, the reliability that serves as an index representing the probability of coincidence of the position identified by a certain point in the first captured image and the position identified by each point in the second captured image and relates each point in the first captured image to the corresponding point in the second captured image based on the calculated reliabilities. The robot system 1 can thus perform the inter-imaging-section calibration with accuracy.

Further, the robot system 1 derives the likelihood function P_1(XP) corresponding to each point in the first captured image and the likelihood function P_2(XP) corresponding to each point in the second captured image and calculates the reliabilities based on the derived likelihood functions. The robot system 1 can thus calculate the reliabilities based on the likelihood functions and perform the inter-imaging-section calibration with accuracy based on the calculated reliabilities.

Further, the robot system 1 calculates the phase associated with a change in luminance or hue of a projection image at each point in the first captured image and the phase associated with a change in luminance or hue of the projection image at each point in the second captured image, derives the likelihood function P_1(XP) based on the calculated phase associated with the first captured image, and derives the second likelihood function based on the phase associated with the second captured image. The control system can thus derive the likelihood functions based on the phases associated with a change in luminance or hue of patterned light to calculate the reliabilities.

The embodiment of the invention has been described in detail with reference to the drawing, but the specific configuration is not limited to that described in the embodiment, and changes, replacement, omission, and other types of modification may be made to the extent that they do not depart from the substance of the invention.

Further, a program for achieving the function of an arbitrary configuration portion in the section described above (controller 30 in robot system 1, for example) may be recorded on a computer readable recording medium, and the program may then be read and executed by a computer system. The term "computer system" used herein is intended to encompass an OS (operating system), a peripheral device, and other types of hardware. Further, the term "computer readable recording medium" refers to a flexible disk, a magneto-optical disk, a ROM (read only memory), a CD-ROM (compact disk ROM), and other portable media, a hard disk drive and other storage devices built in the computer system. The term "computer readable recording medium" is further intended to encompass a component that holds a program for a fixed period, such as a volatile memory (RAM: random access memory) in a computer system that works as a server or a client when a program is transmitted over the Internet or any other network or a telephone circuit or any other communication circuit.

The program described above may be transmitted from a computer system including a storage device or any other component that stores the program to another computer system via a transmission medium or a transmission wave traveling through a transmission medium. The term "transmission medium" used herein, through which the program is transmitted, refers to a medium having a function of transmitting information, such as the Internet and other networks (communication networks) and a telephone circuit and other communication circuits (communication lines).

The program described above may instead be a program that achieves part of the function described above. The program described above may still instead be a program that achieves the function described above when combined with a program having already been stored in a computer system, what is called a difference file (difference program).

The entire disclosure of Japanese Patent Application No. 2014-153750, filed Jul. 29, 2014 is expressly incorporated by reference herein.

What is claimed is:

1. A control system comprising:
a projector that projects predetermined patterned light on a target object;
a first camera that captures a first image of the target object on which the predetermined patterned light is projected by the projector;
a second camera that is disposed in a position different from a position where the first camera is disposed and captures a second image of the target object on which the predetermined patterned light is projected by the projector;
a memory including computer-readable instructions; and
a processor configured to execute the computer-readable instructions to:
calculate a three-dimensional shape of the target object based on a first point in the first image and a second point in the second image;
calculate, based on the first and second images, a reliability that serves as an index representing probability of coincidence of a position identified by a certain point in the first image and a position identified by each point in the second image; and associate each point in the first image to the each point in the second image based on the reliability.

2. The control system according to claim 1,
wherein the processor is configured to execute the computer-readable instructions to:
derive a first likelihood function corresponding to the each point in the first image;
derive a second likelihood function corresponding to the each point in the second image; and
calculate the reliability based on the first and second likelihood functions.

3. The control system according to claim 2,
wherein the patterned light has luminance or hue that periodically changes in a certain direction, and
the processor configured to execute the computer-readable instructions to:
calculate a first phase associated with a change in the luminance or the hue of the patterned light at the each point in the first image and a second phase associated with the change in the luminance or the hue of the patterned light at the each point in the second image;
derive the first likelihood function based on the first phase; and
derive the second likelihood function based on the second phase.

4. A robot system comprising: the control system according to claim 3; and a robot,
wherein the control system includes a robot controller configured to control the robot based on the three-dimensional shape of the target object.

5. A robot system comprising: the control system according to claim 2; and a robot,
wherein the control system includes a robot controller configured to control the robot based on the three-dimensional shape of the target object.

6. A robot system comprising: the control system according to claim 1; and a robot,
wherein the control system includes a robot controller configured to control the robot based on the three-dimensional shape of the target object.

7. A control method for causing a processor to execute computer-readable instructions stored in a memory, the method comprising executing on the processor the step of:
projecting predetermined patterned light on a target object;
causing a first camera to capture a first image of the target object on which the predetermined patterned light is projected;
causing a second camera that is disposed in a position different from a position where the first camera is disposed to capture a second image of the target object on which the predetermined patterned light is projected;
calculating a three-dimensional shape of the target object based on a first point in the first image captured by the first camera and a second point in the second image captured by the second camera;
calculating, based on the first and second images, a reliability that serves as an index representing probability of coincidence of a position identified by a certain point in the first image and a position identified by each point in the second image; and
associating each point in the first image to the each point in the second image based on the reliability.

8. The control method according to claim 7,
wherein the processor is configured to execute the computer-readable instructions to:
derive a first likelihood function corresponding to the each point in the first image;
derive a second likelihood function corresponding to the each point in the second image; and
calculate the reliability based on the first and second likelihood functions.

9. The control method according to claim 8,
wherein the patterned light has luminance or hue that periodically changes in a certain direction, and
the processor which is further configured to execute computer-readable instructions to:
calculate a first phase associated with a change in the luminance or the hue of the patterned light at the each point in the first image and a second phase associated with the change in the luminance or the hue of the patterned light at the each point in the second image;
derive the first likelihood function based on the first phase; and
derive the second likelihood function based on the second phase.

* * * * *